(12) United States Patent
Bostick et al.

(10) Patent No.: US 10,920,817 B2
(45) Date of Patent: Feb. 16, 2021

(54) ANTI-VIBRATION THREAD FORM

(71) Applicant: INFASTECH INTELLECTUAL PROPERTIES PTE. LTD., Singapore (SG)

(72) Inventors: Ryan Bostick, Madison Heights, MI (US); Kevin Peacock, Madison Heights, MI (US)

(73) Assignee: INFASTECH INTELLECTUAL PROPERTIES PTE. LTD., Singapore (SG)

( * ) Notice: Subject to any disclaimer, the term of this patent is extended or adjusted under 35 U.S.C. 154(b) by 222 days.

(21) Appl. No.: 16/096,157

(22) PCT Filed: Apr. 27, 2017

(86) PCT No.: PCT/IB2017/052447
§ 371 (c)(1),
(2) Date: Oct. 24, 2018

(87) PCT Pub. No.: WO2017/187383
PCT Pub. Date: Nov. 2, 2017

(65) Prior Publication Data
US 2019/0136900 A1    May 9, 2019

Related U.S. Application Data

(60) Provisional application No. 62/329,673, filed on Apr. 29, 2016.

(51) Int. Cl.
*F16B 33/02* (2006.01)
*F16B 39/30* (2006.01)

(52) U.S. Cl.
CPC .............. *F16B 33/02* (2013.01); *F16B 39/30* (2013.01)

(58) Field of Classification Search
CPC ...... F16B 33/02; F16B 39/30; F16B 25/0042; F16B 25/0047
(Continued)

(56) References Cited

U.S. PATENT DOCUMENTS 4,023,914 A    5/1977  Holmes
4,171,012 A *  10/1979 Holmes ................... F16B 33/02
                                                      411/285

(Continued)

FOREIGN PATENT DOCUMENTS

CA    2915891 A1    1/2015
CN    201407270 U   2/2010
(Continued)

OTHER PUBLICATIONS

Extended European Search Report for Application No. 17788923.5-1022 / 3449139 PCT/IB 2017052447, EPO Form 1507S. European Patent Office 80298 Munich Germany, dated Dec. 10, 2019. 6 pages.

(Continued)

*Primary Examiner* — Victor D Batson
*Assistant Examiner* — Amit Singh Dhillon
(74) *Attorney, Agent, or Firm* — Vorys, Sater, Seymour and Pease LLP; Rex W. Miller, II

(57) ABSTRACT

A threaded fastener having a thread defined by a crest portion, a leading flank, a first root portion, a second root portion, and a trailing flank, configured to engage an externally threaded trapezoidal threadform. The thread may alternatively be defined by a foot portion, a leading flank, a first crest portion, a second crest portion, and a trailing flank, configured to engage an internally threaded trapezoidal threadform.

15 Claims, 4 Drawing Sheets

(58) Field of Classification Search
USPC ................................................ 411/423, 366.1
See application file for complete search history.

(56) References Cited

U.S. PATENT DOCUMENTS

| | | | | |
|---|---|---|---|---|
| 4,266,590 | A * | 5/1981 | McKewan | F16B 39/30 411/307 |
| 4,594,039 | A * | 6/1986 | Witte | F16B 39/30 411/311 |
| 4,983,084 | A * | 1/1991 | Gray | F16B 19/05 411/311 |
| 5,282,707 | A * | 2/1994 | Palm | F16B 31/02 29/407.02 |
| 5,340,254 | A | 8/1994 | Hertel et al. | |
| 5,387,239 | A * | 2/1995 | Bianco | F16B 39/30 623/23.45 |
| 5,782,637 | A | 7/1998 | Cosenza | |
| 7,494,159 | B2 | 2/2009 | Sugino et al. | |
| 8,899,898 | B2 | 12/2014 | Rosenkranz et al. | |
| 9,046,120 | B2 | 6/2015 | Phua et al. | |
| 2004/0081535 | A1 * | 4/2004 | Birkelbach | F16B 25/0021 411/411 |
| 2007/0280803 | A1 * | 12/2007 | Pritchard | F16B 33/02 411/411 |
| 2009/0116929 | A1 | 5/2009 | Shea et al. | |
| 2012/0097286 | A1 * | 4/2012 | Herre | B05C 5/0225 138/109 |
| 2012/0195713 | A1 * | 8/2012 | Gu | F16B 39/30 411/411 |
| 2017/0030393 | A1 | 2/2017 | Phua et al. | |

FOREIGN PATENT DOCUMENTS

| | | |
|---|---|---|
| CN | 202560774 U | 11/2012 |
| CN | 202991781 U | 6/2013 |
| CN | 202991798 U | 6/2013 |
| CN | 202991799 U | 6/2013 |
| CN | 202991800 U | 6/2013 |
| EP | 2 572 081 A1 | 3/2013 |
| WO | 2010133116 A1 | 11/2010 |
| WO | 2016012224 | 1/2016 |

OTHER PUBLICATIONS

Korean Intellectual Property Office, International Search Report and Written Opinion of the International Searching Authority, dated Aug. 17, 2017, Form PCT/ISA/220. Authorized officer: Chan Yoon Hwang.

* cited by examiner

ANTI-VIBRATION THREAD FORM

CROSS-REFERENCE TO RELATED APPLICATION

This application claims priority to International Application No. PCT/IB2017/052447, filed Apr. 27, 2017, which claims priority to U.S. Provisional Patent Application No. 62/329,673, filed Apr. 29, 2016, the disclosures of which are incorporated herein by reference.

BACKGROUND AND SUMMARY

The present invention relates generally to threaded fasteners of any size, and more particularly to vibration resistant, internally threaded fasteners for use with trapezoidal thread forms.

Threaded fasteners having trapezoidal thread forms are used in many applications, and especially in applications where the fastener will be subjected to large forces, such as fire hydrants and drive screws. Many applications of these applications require that threaded fasteners maintain desired clamping forces through vibration and other in-use loads. A common problem with prior fasteners included loosening under vibration. These applications also frequently use larger diameter fasteners, such as those with a major diameter of at least two inches. In addition, some applications require the use of an internally threaded hole in a component that is configured to receive an externally threaded component, such as a bolt or drive screw.

Due to the high pressures and large diameters, the available options for providing vibration resistant internally threaded fasteners has been limited. Fastener coatings have been developed to compensate for some of the failures of prior fasteners, such as thread-sealing adhesives, thread lubricants, anti-vibration coatings, and patches of nylon or similar materials. However, thread coatings require additional material cost and application cost, and the amount of material increases significantly as fasteners become larger. Some applications have relied upon excessive force to force a nut onto a threaded connection, which may result in deformation preventing reuse of the nut once it is removed. Other approaches have required separate components, such as pins, to restrict movement of the nut. Still other approaches have required modifications that prevented the threaded connection from being easily rotated thereby increasing the difficulty of using such devices.

In view of the above limitations, there remains a need for a threaded fastener that overcomes these and other disadvantages of the prior art.

We have found that new thread profiles that provide point contact improve the vibration resistance of the threaded fastener, and thereby greatly reduce and may eliminate the need for alternative vibration mitigation techniques such as nylon patches, pins, or other devices which prevent the reuse of such anti-vibration fasteners. We have also found that these new thread profiles enable the internally threaded fastener to spin freely while mating, and to be reused multiple times.

In various embodiments, a threaded fastener includes a first end, a second end, and an internally threaded portion extending between the first end and the second end. The threaded fastener also has a longitudinal axis extending through the fastener from the first end to the second end, and a normal axis extending perpendicular to the longitudinal axis.

In one embodiment, the threaded fastener has a threaded portion configured to engage a mating thread, and the threaded portion has a thread defined by, in series, a crest portion oriented at an angle of 0°+/−5° relative to the longitudinal axis, a leading flank oriented at an angle of 15°+/−5° relative to the normal axis, a first root portion oriented at an angle of 1° to 75° relative to the longitudinal axis, a second root portion oriented at an angle of 0°+/−5° relative to the longitudinal axis, and a trailing flank oriented at an angle of 15°+/−5° relative to the normal axis.

In other embodiments, the thread is defined by, in series, the crest portion oriented at an angle of approximately 0° relative to the longitudinal axis, the leading flank oriented at an angle of approximately 15° relative to the normal axis, the first root portion oriented at an angle of approximately 450 or 600 relative to the longitudinal axis, the second root portion oriented at an angle of approximately 0° relative to the longitudinal axis, and the trailing flank oriented at an angle of approximately 15° relative to the normal axis.

In another embodiment, the threaded fastener has a threaded portion configured to engage a mating thread, and the threaded portion has a thread defined by, in series, a crest portion oriented at an angle of 0°+/−5° relative to the longitudinal axis, a leading flank oriented at an angle of 20°+/−5° relative to the normal axis, a first root portion oriented at an angle of 10 to 75° relative to the longitudinal axis, a second root portion oriented at an angle of 00+/−50 relative to the longitudinal axis, and a trailing flank oriented at an angle of 20°+/−5° relative to the normal axis.

In yet other embodiments, the first root portion is oriented at an angle between 40° and 65°. In yet other embodiments, the crest portion, the leading flank, the root portion, and the trailing flank may be oriented at +/−1° or +/−2.5° from the angles previously noted.

Also disclosed is a threaded fastener system that includes an externally threaded shank, and an internally threaded fastener. The externally threaded shank has a trapezoidal thread with a thread angle of between 29° and 40° over at least a portion of the externally threaded shank. The internally threaded fastener is configured to mate with the externally threaded shank. In some embodiments, the externally threaded shank is a bolt or a screw, and the internally threaded fastener is a nut. In some embodiments, the externally threaded shank is an Acme thread form.

In yet another embodiment, a threaded fastener system includes an internally threaded fastener having a trapezoidal thread with a thread angle of between 29° and 40° over at least a portion of the internally threaded fastener, and an externally threaded shank configured to mate with the internally threaded fastener. The externally threaded shank has a first end, a second end, an externally threaded portion extending between the first end and the second end, a longitudinal axis extending through the externally threaded shank from the first end to the second end, and a normal axis extending perpendicular to the longitudinal axis. The threaded portion has a thread defined by, in series, a root portion oriented at an angle of 0°+/−50 relative to the longitudinal axis, a leading flank oriented at an angle of 15°+/−5° relative to the normal axis, a first crest portion oriented at an angle of 40° to 65° relative to the longitudinal axis, a second crest portion oriented at an angle of 0°+/−5° relative to the longitudinal axis, and a trailing flank oriented at angle of 15°+/−5° relative to the normal axis, such that when an axial force is applied to the externally threaded shank, the second crest portion of the externally threaded shank engages a portion of the trapezoidal thread and inhibits vibrational loosening of the externally threaded shank from the internally threaded fastener.

BRIEF DESCRIPTION OF THE DRAWINGS

Reference is made to the accompanying drawings in which particular embodiments are illustrated as described in more detail in the description below, in which.

DETAILED DESCRIPTION

Figure 1A:
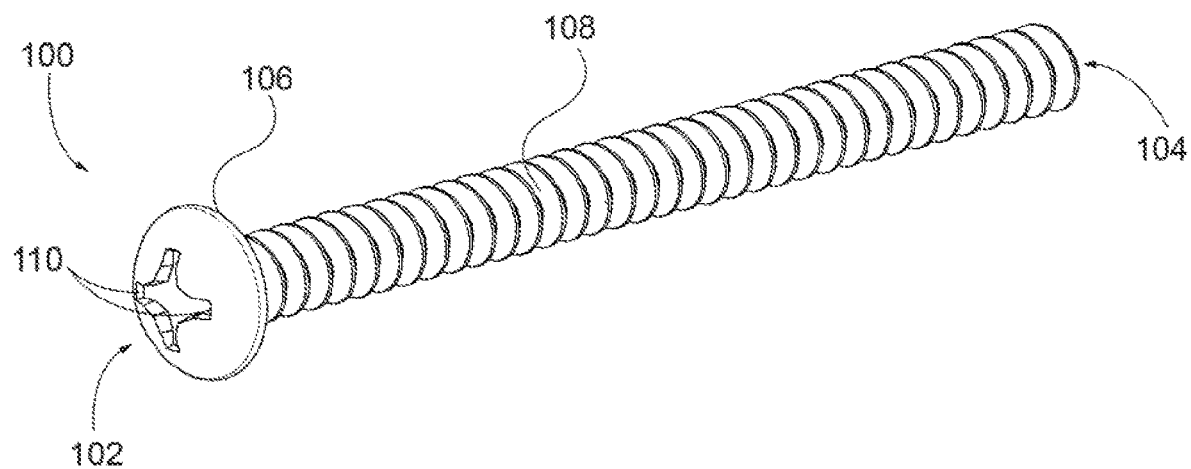
FIG. 1A is a perspective view of an externally threaded fastener according to one embodiment.

Referring now to FIGS. 1-4, embodiments of the presently disclosed threaded fastener and fastener system are illustrated. As shown in FIG. 1A and FIG. 1B, an externally threaded fastener 100 includes a threaded portion 108 extending from a first end 102 to a second end 104. The second end 104 may alternatively be referred to as the lead end of the fastener based upon the driving direction D of the fastener. In one embodiment, the threaded fastener is a screw having a head 106. The threaded portion 108 is defined by a helical thread extending around an elongated shank that extends from the head 106 to the second end 104. As described further below, the thread is defined by at least a crest portion, a leading flank, a root portion, and a trailing flank. The configuration of the thread may be defined by reference to a longitudinal axis and/or a normal axis of the threaded fastener. The longitudinal axis extends through the fastener from the first end to the second end, whereas the normal axis extends perpendicular to the longitudinal axis.

Figure 2:
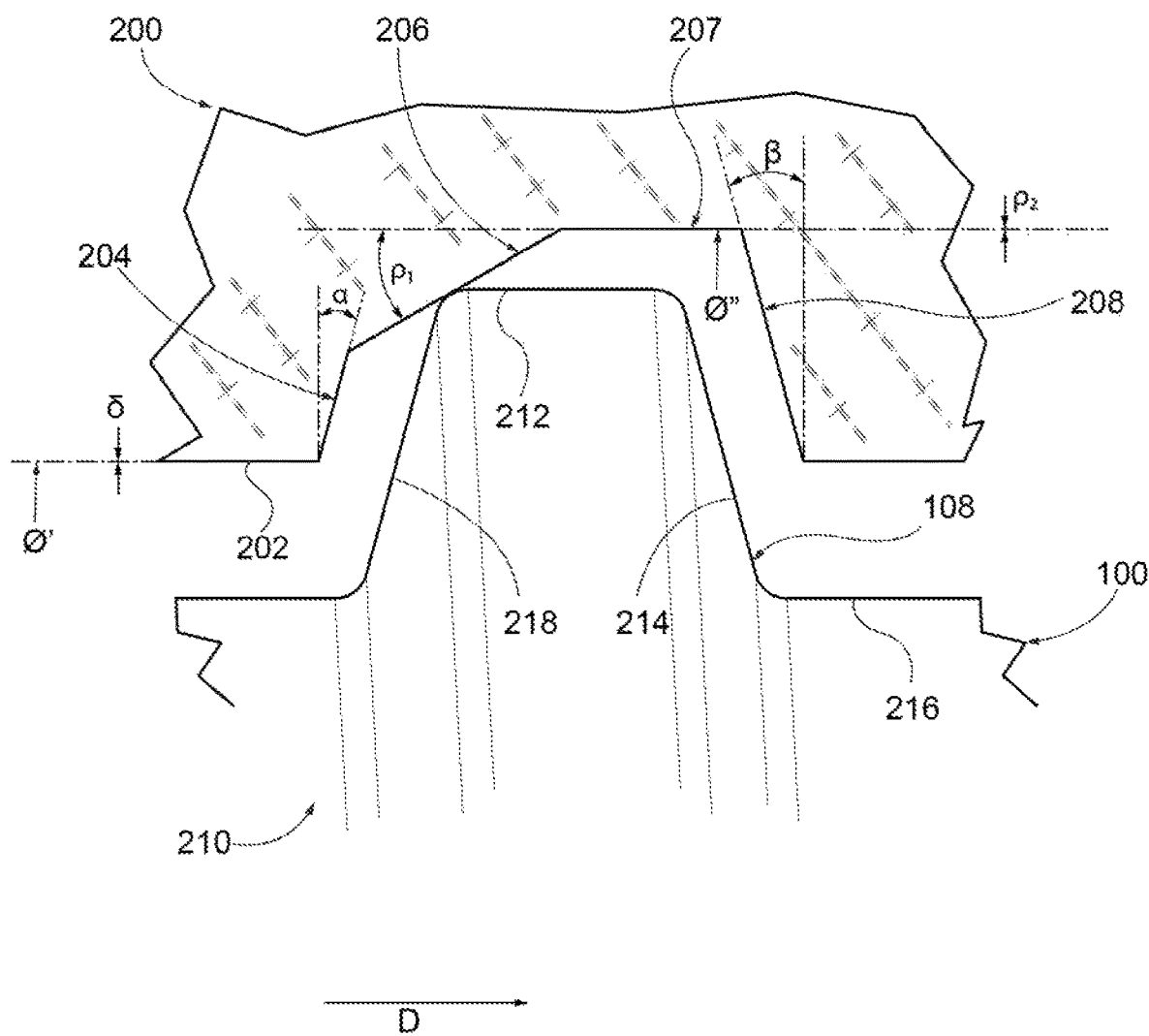
FIG. 2 is a detail view of an embodiment of an internally threaded fastener of the present invention engaged to the externally threaded fastener of FIG. 1.
Figure 3:
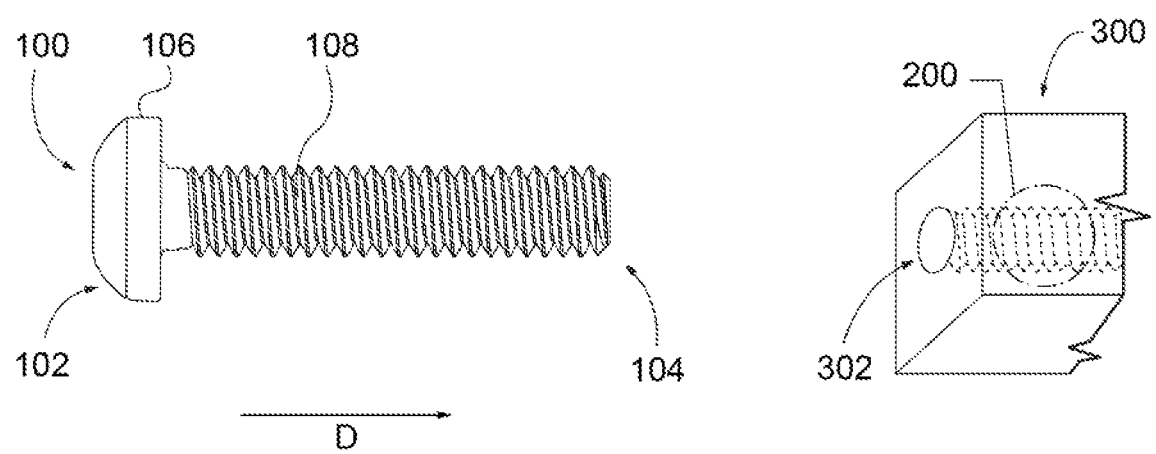
FIG. 3 is a detail view of an alternate embodiment of an internally threaded fastener of FIG. 2.

In various embodiments, the externally threaded fastener has a trapezoidal thread as shown in FIGS. 2-3. The trapezoidal thread may be symmetric thread, such as an Acme thread with a thread angle of 29°. In other embodiments, the trapezoidal thread may have a thread angle of 30° or 40°. The trapezoidal thread may conform to one or more standards such as ASME/ANSI B 1.5-1988 or DIN 103, which are incorporated herein by reference. In yet other embodiments, an externally threaded fastener may have a square thread with leading and trailing flanks oriented at an angle of approximately 90° to the longitudinal axis of the fastener.

Figure 1B:
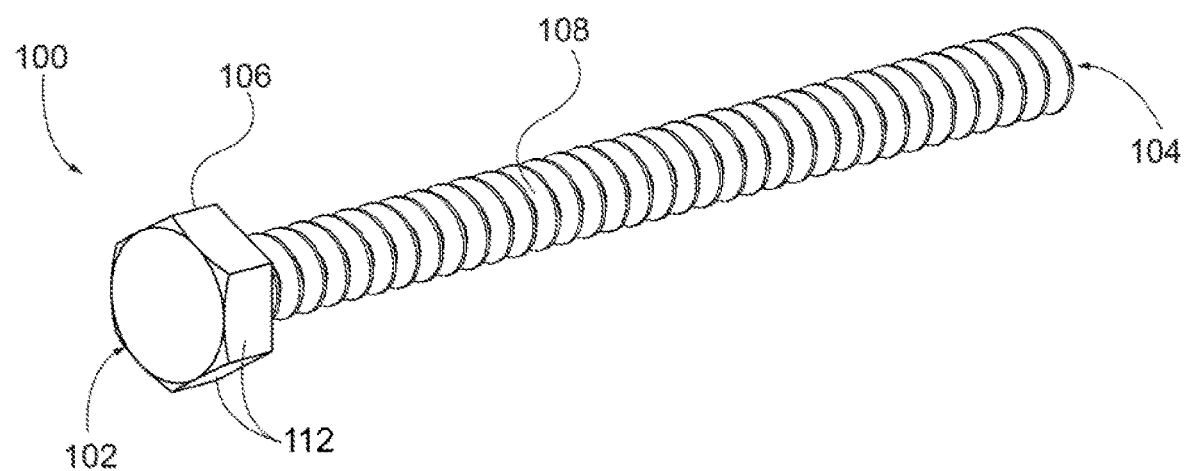
FIG. 1B is a perspective view of an externally threaded fastener according to another embodiment.

As shown, the thread portion 108 extends along the elongated shank with the helical thread repeating in cross-section, with the adjacent threads axially separated by the distance of the pitch. FIG. 1A illustrates an embodiment where the head 106 of the fastener includes internal drive surfaces 110 configured to receive a driver for transmitting torque to the fastener. In other embodiments, however, the head may be differently configured so as to include, for example, external drive surfaces 112 as illustrated in FIG. 1B. In yet other embodiments, the externally threaded fastener may be a headless screw, in which the first end includes a recess into the shank and the recess in the shank includes drive surfaces.

Referring now to FIGS. 2-3, embodiments of an internally threaded fastener 200 profile according to the present disclosure are shown in cross-section engaged to an externally threaded shank, such as that illustrated in FIG. 1. These configurations of the internally threaded fastener may provide improved vibration resistance as compared to previously available fasteners, while also reducing or eliminating the need for other anti-vibration measures, such as patches or locking pins. In addition, the internally threaded fastener may be reusable to the extent the use of patches or other consumable locking materials are not required to achieve the anti-vibration performance.

As illustrated in FIG. 2, the presently disclosed fastening system may encompass internally threaded fasteners (e.g., nuts), as well as fastening systems that mate internally threaded fasteners and externally threaded fasteners, where the internally threaded fastener is configured in accordance with this disclosure. In other embodiments, the internally threaded fastener may be a threaded hole that is formed, cut or tapped into a component or work piece as depicted in FIG. 3 so to provide the internal thread form presently disclosed and, in these other embodiments, the threaded hole is thus configured to receive an externally threaded component. In some embodiments, the externally threaded fastener may be a drive screw and the internally threaded fastener is a threaded hole that receives the drive screw. In this manner, references to a fastening system refer to the connection between the internally and externally threaded components, even though such components are driven with respect to each other during operation of the system. The presently disclosed systems thus provide improved anti-vibration performance over a wide range of applications.

Referring now to FIGS. 2-3, the configuration of the thread 200 of the internally threaded fastener is illustrated for embodiments of the threaded fastener. FIG. 2 illustrates an example embodiment of the fastening system where thread 200 is configured within a fastener such as a nut; FIG. 3 illustrates an alternate embodiment where thread 200 is configured within a threaded hole 302 machined into a part, such as work piece 300. The thread includes a crest portion, a leading flank, a first root portion, a second root portion, and a trailing flank. As used herein, the crest portion defines the minor diameter $\emptyset'$ of the internally threaded fastener and is defined in profile by an angle between the crest portion and the longitudinal axis of the fastener, also referred to as a crest angle $\delta$. The leading flank is angled towards the lead end and is defined in profile by an angle between the leading flank and the normal axis (i.e., a plane normal to the longitudinal axis of the fastener), also referred to as the lead angle $\alpha$. As used herein, the root portion defines the major diameter $\emptyset''$ of the internally threaded fastener and is defined in profile by an angle between the root portion and the longitudinal axis of the fastener, also referred to as the root angle $\rho$. In embodiments with more than one root portion (i.e., root portion 1, root portion 2, . . . , root portion n), each root portion is defined in profile by a root angle (i.e., $\rho_1, \rho_2, \ldots \rho_n$) and, in some embodiments each root angle is different; however, in other embodiments at least some of the root angles are the same. The trailing flank is angled opposite the leading flank, and is defined in profile by an angle between the trailing flank and the normal axis (i.e. a plane normal to the longitudinal axis of the fastener), also referred to as the trail angle $\beta$. For clarity, angles are indicated as positive values measured in the direction indicated in the figure.

As shown in FIGS. 2-3, an internal thread 200 of a first embodiment of an internally threaded fastener is illustrated. The crest portion 202 oriented at a crest angle $\delta$ of approximately 0° relative to the longitudinal axis of the fastener.

The leading flank 204 is oriented at a lead angle α of approximately 15° relative to the normal axis of the fastener. The first root portion 206 is oriented at a root angle $\rho_1$ of approximately 40° relative to the longitudinal axis of the fastener. The second root portion 207 is oriented at a root angle $\rho_2$ of approximately 0° relative to the longitudinal axis of the fastener. The trailing flank 208 is oriented at trail angle β of approximately 15° relative to the normal axis.

As shown in FIGS. 2-3, the thread 200 provides point contact with a mating thread 210, which improves the vibration resistance of the threaded fastener. For purposes of illustration, the mating thread 210 is illustrated as a symmetric Acme (trapezoidal) thread having a crest portion 212, a first flank 214, a root portion 216, and a second flank 218. The first flank 214 and the second flank 218 are oriented at approximately 15° relative to the normal axis, while the crest portion 212 and root portion 216 are oriented at approximately 0° relative to the longitudinal axis. This configuration is common in commercially available products having the Acme thread.

When the thread 200 is mated with the mating thread 210, the configuration of the thread 200 results in point contact as shown in FIG. 2. The first root portion 206 of the thread 200 contacts the corner of the crest portion 212 of the mating thread 210. As will be apparent, the contact point between the internal thread 200 and the mating external thread 210 extends helically along the length of the threaded fastener improving the stability and vibration resistance. In this manner, when an axial force is applied to the internally threaded fastener, the first root portion of the internally threaded fastener engages a portion of the trapezoidal thread and inhibits vibrational loosening of the internally threaded fastener from the externally threaded shank.

The point of contact between the thread 200 and the mating thread 210 improves the vibration resistance of the threaded fastener by limiting vibration induced movement. By locking the crest portion of the external thread to the first root portion of the internal thread, the potential for movement as a result of vibration is significantly improved. In contrast, conventional threads contact the mating thread only along the flanks leaving significant radial clearance at both the crest and root. That radial clearance permits vibration induced movement which results in loosening of the fastener as shown in the test results below.

The angle $\rho_1$ of the first root portion may be selected to achieve the desired contact with the external mating thread. In some embodiments, the first root portion may be oriented at an angle $\rho_1$ that is between 1° and 75°. In some embodiments, the first root portion may be oriented at an angle $\rho_1$ that is approximately 60°.

Figure 4:
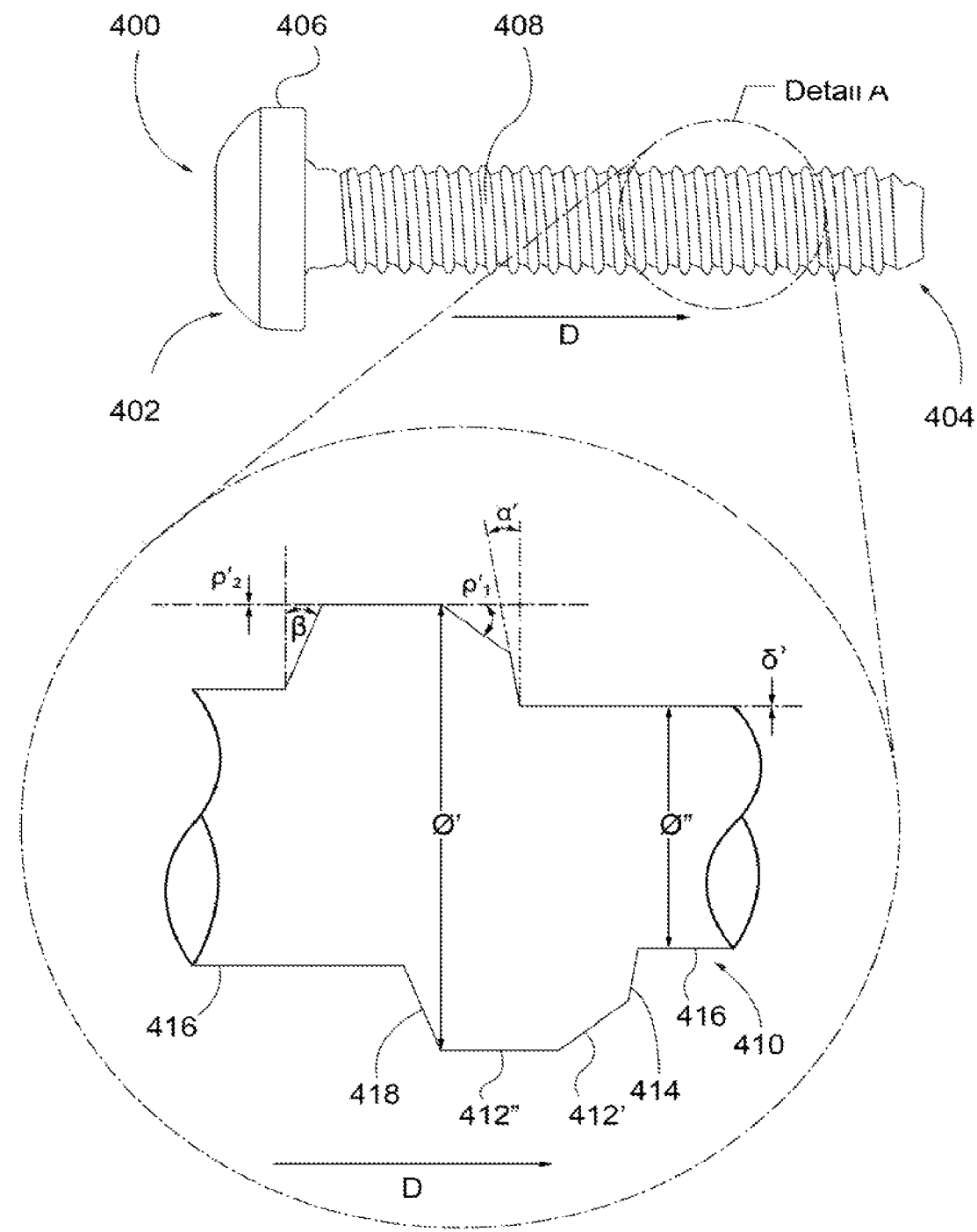
FIG. 4 is a detail view of an externally threaded fastener of the present invention that may be received by an internally threaded fastener.

Referring now to FIG. 4, an externally threaded fastener 400 according to an alternate embodiment is illustrated. Here, externally threaded fastener 400 includes a threaded portion 408 extending from a first end 402 to a second end 404. The second end 404 may alternatively be referred to as the lead end of the fastener based upon the driving direction D of the fastener. In one embodiment, the threaded fastener is a screw having a head 406. The threaded portion 408 is defined by a helical thread having thread profile 410 extending around an elongated shank that extends from the head 406 to the second end 404. The configuration of the thread 410 may be defined by reference to a longitudinal axis and/or a normal axis of the threaded fastener 400. The longitudinal axis extends through the fastener 400 from the first end 402 to the second end 404, whereas the normal axis extends perpendicular to the longitudinal axis.

As shown in FIG. 4, the thread 410 comprises a root portion 416, a leading flank portion 414, a first crest portion 412', a second crest portion 412", and a trailing flank portion 418. As used herein, the crest portion defines the major diameter Ø' of the externally threaded fastener 400 and is defined in profile by an angle between the crest portion and the longitudinal axis of the fastener, also referred to as angle ρ'. In embodiments with more than one crest portion (i.e., crest portion 1, crest portion 2, . . . , crest portion n), each crest portion may be defined in profile by a crest angle (i.e., $\rho_1, \rho_2, \ldots \rho_n$) and, in some embodiments each crest angle is different; however, in other embodiments at least some of the crest angles are the same. The leading flank 414 is angled towards the lead end 404 and is defined in profile by an angle between the leading flank and the normal axis (i.e. a plane normal to the longitudinal axis of the fastener), also referred to as the lead angle α'. As used herein, the root portion 416 defines the minor diameter Ø' of the externally threaded fastener and is defined in profile by an angle between the root portion and the longitudinal axis of the fastener, also referred to as the root angle δ'. The trailing flank 418 is angled opposite the leading flank 414, and is defined in profile by an angle between the trailing flank and the normal axis (i.e. a plane normal to the longitudinal axis of the fastener), also referred to as the trail angle β'. For clarity, angles are indicated as positive values measured in the direction indicated in the figure. It will be appreciated that, due to the helical nature of thread 410, in cross-section, the bottom portion of thread 410 appears off-set relative to the top portion of the thread 410 by a distance depending on the thread angle as the thread rotates around the shaft. For purposes of illustration, only one rotation of the thread is shown in cross-section in Detail A of FIG. 4.

An externally threaded fastener of the present invention, such as fastener 400, may mate with various types of internally threaded fastener, for example, a nut or work tapped with a symmetric Acme (trapezoidal) internal threads piece (not illustrated). In one example embodiment, the root portion 416 is oriented at a root angle δ' of approximately 0° relative to the longitudinal axis of the fastener. The leading flank 414 is oriented at a lead angle α' of approximately 15° relative to the normal axis of the fastener. The first crest portion 412' is oriented at a first crest angle $\rho'_1$ of approximately 40° relative to the longitudinal axis of the fastener, whereas the second crest portion 412" is oriented at a second crest angle $\rho'_2$ of approximately 00 relative to the longitudinal axis of the fastener. The trailing flank 418 is oriented at trail angle $\rho'_1$ of approximately 15° relative to the normal axis. It will be appreciated, however, that other geometries may be utilized as detailed above with respect to the thread profiles of internally threaded fasteners.

The embodiments of the thread for the presently disclosed threaded fastener have been described by angle relative to the longitudinal axis or normal axis of the threaded fastener. The phrase "approximately X°" is intended to mean a design or specified value of X, while allowing for standard manufacturing tolerances and variations. In one example, manufacturing tolerances and variations may be up to and including +/−0.5°. In various embodiments, the angles defining each portion of the thread configuration may vary by +/−1°, +/−2.5°, +/−5°, while still achieving the improved vibration resistance. Moreover, the variation of angle need not be uniform across all portions of the thread configuration. For example, in one embodiment, the crest portion and root portion may vary by +/−5° from the angles illustrated above, while the leading flank and trailing flank are held within +/−1° of the angles illustrated above. All such variations are contemplated as within the scope of this disclosure. In addition, a range defined by "+/−" a certain value are intended to be inclusive of the end points of the range. For example, "0°+/−5°" means −5° to +5° inclusive.

In yet other embodiments, the first end of the threaded fastener includes a radially extending surface. In some embodiments, the threaded fastener is a nut (or similar internally threaded structure) and the radially extending surface is the top surface of the fastener configured to mate with a component. In each embodiment, the radially extending surface may include a plurality of serrations configured to further improve the vibration resistance of the presently disclosed threaded fastener.

The presently disclosed threaded fastener may be made from low carbon steel, alloy steel, aluminum, brass or other materials as desired. The threaded fasteners may be made of a material for assembling parts made from plastic, brass, aluminum, wood, concrete, steel, or other component materials.

Experimental samples of the presently disclosed internally threaded fasteners were produced and tested compared with a selection of commercially available comparative fasteners.

The tests were conducted to compare the clamp load retention difference between a standard Acme style male and female thread form versus a standard Acme male thread tightened into a female thread form according to the present disclosure. For both styles of thread forms, identical male and female threaded coupons were produced in mild carbon steel. The coupons were designed to replicate bolted connection with under head surfaces and a drive feature for applying tightening torque. The fasteners were tested for vibration loosening in a vibration test conducted at +/−1.0 mm displacement at 12.5 Hz for 400 cycles under the mating surface of a female threaded member and a male threaded member, thereby creating a "slip" between the surfaces that induces movement between male and female threads. This movement rotates the nut from the stud and reduces clamp load which results in loosening of the bolted joint. The testing conformed to DIN-65151 and DIN-25201, which are incorporated by reference.

Table 1 ("Invention") below provides the vibration test performance results for six samples of a standard Acme style male thread form mated with samples of the presently disclosed internal thread form of FIG. 2.

Table 2 ("Comparison") below provides the vibration test performance results for six samples of a standard Acme style male thread form mated with samples of a prior art standard Acme style female thread form.

TABLE 1

| Sample Type/Number Invention | Preload KN | #cycles @ 12.5 Hz | remaining preload KN | remaining preload % |
|---|---|---|---|---|
| 1 | 11.7 | 400 | 8.8 | 75.1% |
| 2 | 11.2 | 400 | 8.4 | 75.0% |
| 3 | 11.4 | 400 | 8.2 | 72.0% |
| 4 | 11.7 | 400 | 8.4 | 71.6% |
| 5 | 11.8 | 400 | 8.3 | 69.0% |
| 6 | 12.8 | 400 | 9.0 | 74.9% |
| Avg. | 11.8 | | 8.5 | 72.9% |

TABLE 2

| Sample Type/Number Comparison | Preload KN | #cycles @ 12.5 Hz | remaining preload KN | remainig preload % |
|---|---|---|---|---|
| 1 | 12.2 | 400 | 4.1 | 33.4% |
| 2 | 12.0 | 400 | 3.7 | 30.7% |
| 3 | 12.6 | 400 | 5.0 | 41.7% |
| 4 | 11.4 | 400 | 4.4 | 38.7% |
| 5 | 11.6 | 231 | 0.0 | 0.0% |
| 6 | 12.0 | 400 | 2.3 | 19.1% |
| Avg. | 12.0 | | 3.25 | 27.5% |

As shown above, the presently disclosed fasteners achieved the best performance in the test with greater than a 250% improvement in the average remaining preload. In addition to improved vibration resistance, the presently disclosed fasteners are reusable in contrast to prior anti-vibration fasteners.

In addition, tests were conducted at different preload load levels from 2 KN to 22 KN for ⅜-16 Acme thread sizes. It was observed that the loosening characteristics were consistent across multiple sizes of fasteners further demonstrating the improved performance characteristics of the presently disclosed fastener and fastening system. In addition, Sample 6 of Table 1 was tested three times and in each case the remaining preload was 74.9% demonstrating the reusability and consistency of the disclosed thread form.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A threaded fastener comprising:
   a first end, a second end, and an internally threaded portion extending between the first end and the second end,
   wherein the fastener has a longitudinal axis extending through the fastener from the first end to the second end, and a normal axis extending perpendicular to the longitudinal axis, and
   wherein the threaded portion has a thread defined by, in series,
      a crest portion oriented at an angle of 0°+/−5° relative to the longitudinal axis,
      a leading flank oriented at an angle of 15°+/−5° relative to the normal axis,
      a first root portion oriented at an angle of 40° to 65° relative to the longitudinal axis,
      a second root portion oriented at an angle of 0°+/−5° relative to the longitudinal axis, and
      a trailing flank oriented at angle of 15°+/−5° relative to the normal axis.

2. The threaded fastener of claim 1, wherein the thread is defined by, in series,
   the crest portion oriented at an angle of 0°+/−1° relative to the longitudinal axis,
   the leading flank oriented at an angle of 15°+/−1° relative to the normal axis,
   the first root portion oriented at an angle of 45°+/−1° relative to the longitudinal axis,
   the second root portion oriented at an angle of 0°+/−1° relative to the longitudinal axis, and
   the trailing flank oriented at angle of 15°+/−1° relative to the normal axis.

3. The threaded fastener of claim 1, wherein the thread is defined by, in series,
   the crest portion oriented at an angle of 0°+/−1° relative to the longitudinal axis,
   the leading flank oriented at an angle of 15°+/−1° relative to the normal axis,
   the first root portion oriented at an angle of 60°+/−1° relative to the longitudinal axis,
   the second root portion oriented at an angle of 0°+/−1° relative to the longitudinal axis, and
   the trailing flank oriented at angle of 15°+/−1° relative to the normal axis.

4. The threaded fastener of claim 1, wherein the thread is defined by, in series,
   the crest portion oriented at an angle of approximately 0° relative to the longitudinal axis,
   the leading flank oriented at an angle of approximately 15° relative to the normal axis,
   the first root portion oriented at an angle of approximately 45° or 60° relative to the longitudinal axis,
   the second root portion oriented at an angle of approximately 0° relative to the longitudinal axis, and
   the trailing flank oriented at angle of approximately 15° relative to the normal axis.

5. The threaded fastener as claimed in claim 1, further comprising external drive surfaces.

6. The threaded fastener as claimed in claim 1, wherein the threaded fastener is a threaded hole configured to receive an externally threaded shank.

7. A threaded fastener comprising:
   a first end, a second end, and an internally threaded portion extending between the first end and the second end,
   wherein the fastener has a longitudinal axis extending through the fastener from the first end to the second end, and a normal axis extending perpendicular to the longitudinal axis, and
   wherein the threaded portion has a thread defined by, in series,
      a crest portion oriented at an angle of 0°+/−5° relative to the longitudinal axis,
      a leading flank oriented at an angle of 20°+/−5° relative to the normal axis,
      a first root portion oriented at an angle of 40° to 65° relative to the longitudinal axis,
      a second root portion oriented at an angle of 0°+/−5° relative to the longitudinal axis, and
      a trailing flank oriented at angle of 20°+/−5° relative to the normal axis.

8. The threaded fastener of claim 7, wherein the thread is defined by, in series,
   the crest portion oriented at an angle of approximately 0° relative to the longitudinal axis,
   the leading flank oriented at an angle of approximately 20° relative to the normal axis,
   the first root portion oriented at an angle of approximately 45° or 60° relative to the longitudinal axis,
   the second root portion oriented at an angle of approximately 0° relative to the longitudinal axis, and
   the trailing flank oriented at angle of approximately 20° relative to the normal axis.

9. The threaded fastener as claimed in claim 7, wherein the threaded fastener is a threaded hole configured to receive an externally threaded shank.

10. A threaded fastener system comprising:
    an externally threaded shank having a trapezoidal thread with a thread angle of between 29° and 40° over at least a portion of the externally threaded shank, and
    an internally threaded fastener configured to mate with the externally threaded shank, the internally threaded fastener having:
    a first end, a second end, and an internally threaded portion extending between the first end and the second end,
    wherein the internally threaded fastener has a longitudinal axis extending through the internally threaded fastener from the first end to the second end, and a normal axis extending perpendicular to the longitudinal axis, and
    wherein the threaded portion has a thread defined by, in series,
       a crest portion oriented at an angle of 0°+/−5° relative to the longitudinal axis,
       a leading flank oriented at an angle of 15°+/−5° relative to the normal axis,
       a first root portion oriented at an angle of 40° to 65° relative to the longitudinal axis,
       a second root portion oriented at an angle of 0°+/−5° relative to the longitudinal axis, and
       a trailing flank oriented at angle of 15°+/−5° relative to the normal axis,
    wherein, when an axial force is applied to the internally threaded fastener, the first root portion of the internally threaded fastener engages a portion of the trapezoidal thread and inhibits vibrational loosening of the internally threaded fastener from the externally threaded shank.

11. The threaded fastener system of claim 10, wherein the externally threaded shank comprises an Acme thread form.

12. The threaded fastener system of claim 10, wherein the externally threaded shank is a bolt, and the internally threaded fastener is a nut.

13. The threaded fastener system of claim 10, wherein the internally threaded fastener is a threaded hole.

14. The threaded fastener system of claim 10, wherein the externally threaded shank is a drive screw and the internally threaded fastener is a threaded hole in a component configured to receive the drive screw.

15. A threaded fastener system comprising:
- an internally threaded fastener having a trapezoidal thread with a thread angle of between 29° and 40° over at least a portion of the internally threaded fastener, and
- an externally threaded shank configured to mate with the internally threaded fastener, the externally threaded shank having:
  - a first end, a second end, and an externally threaded portion extending between the first end and the second end,
  - wherein the externally threaded shank has a longitudinal axis extending through the externally threaded shank from the first end to the second end, and a normal axis extending perpendicular to the longitudinal axis, and
  - wherein the threaded portion has a thread defined by, in series,
    - a root portion oriented at an angle of 0°+/−5° relative to the longitudinal axis,
    - a leading flank oriented at an angle of 15°+/−5° relative to the normal axis,
    - a first crest portion oriented at an angle of 40° to 65° relative to the longitudinal axis,
    - a second crest portion oriented at an angle of 0°+/−5° relative to the longitudinal axis, and
    - a trailing flank oriented at angle of 15°+/−5° relative to the normal axis,
  - wherein, when an axial force is applied to the externally threaded shank, the second crest portion of the externally threaded shank engages a portion of the trapezoidal thread and inhibits vibrational loosening of the externally threaded shank from the internally threaded fastener.

* * * * *